(12) United States Patent
Imai et al.

(10) Patent No.: US 11,671,699 B2
(45) Date of Patent: Jun. 6, 2023

(54) ELECTRONIC DEVICE AND CONTROL METHOD FOR CONTROLLING THE SAME

(71) Applicant: CANON KABUSHIKI KAISHA, Tokyo (JP)

(72) Inventors: Yoichiro Imai, Tokyo (JP); Daiyu Ueno, Kanagawa (JP); Tomoyuki Shiozaki, Kanagawa (JP); Hiroshi Toriumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 17/200,203

(22) Filed: Mar. 12, 2021

(65) Prior Publication Data
US 2021/0297586 A1 Sep. 23, 2021

(30) Foreign Application Priority Data
Mar. 18, 2020 (JP) .............................. JP2020-048158

(51) Int. Cl.
| | |
|---|---|
| *H04N 5/232* | (2006.01) |
| *H04N 23/60* | (2023.01) |
| *G01K 13/00* | (2021.01) |
| *H04N 17/00* | (2006.01) |
| *H04N 23/66* | (2023.01) |
| *H04N 23/63* | (2023.01) |

(52) U.S. Cl.
CPC ............ *H04N 23/64* (2023.01); *G01K 13/00* (2013.01); *H04N 17/002* (2013.01); *H04N 23/634* (2023.01); *H04N 23/66* (2023.01)

(58) Field of Classification Search
CPC ......... H04N 5/23222; H04N 5/232941; H04N 5/23203; H04N 17/002; H04N 5/77; H04N 9/80; H04N 5/232; H04N 9/64; H04N 5/222; G01K 13/00
USPC ........................................................ 348/187
See application file for complete search history.

(56) References Cited

U.S. PATENT DOCUMENTS

| | | | | |
|---|---|---|---|---|
| 8,447,161 B2 * | 5/2013 | Okazaki | ........... | H04N 5/232939 348/333.01 |
| 8,582,021 B2 * | 11/2013 | Nakahira | ................ | G03B 7/097 348/229.1 |
| 8,666,221 B2 * | 3/2014 | Okazaki | ................. | H04N 5/772 386/227 |
| 2007/0285542 A1 * | 12/2007 | Suzuki | ............. | H04N 5/232941 348/E5.042 |
| 2009/0112506 A1 | 4/2009 | Kazama | | |

(Continued)

FOREIGN PATENT DOCUMENTS

| | | |
|---|---|---|
| JP | 2007074095 A | 3/2007 |
| JP | 2012165372 A | 8/2012 |
| JP | 2017073740 A | 4/2017 |

*Primary Examiner* — Trang U Tran
(74) *Attorney, Agent, or Firm* — Canon U.S.A., Inc. IP Division

(57) ABSTRACT

An electronic device includes an acquisition unit configured to acquire a temperature of an imaging apparatus, and at least memory and at least one processor which function as a calculation unit configured to calculate a time limit for recording a moving image based on the temperature acquired by the acquisition unit, and a control unit configured to perform control to display the time limit on a display unit in a standby state where a moving image is not recorded in a moving image recording mode.

20 Claims, 8 Drawing Sheets

(56) References Cited

U.S. PATENT DOCUMENTS

2012/0189264 A1 7/2012 Okazaki
2017/0102748 A1 4/2017 Takahashi

* cited by examiner

ELECTRONIC DEVICE AND CONTROL METHOD FOR CONTROLLING THE SAME

BACKGROUND OF THE INVENTION

Field of the Invention

The present invention relates to an electronic device that controls an operation restriction regarding heat on an imaging apparatus capable of recording a moving image, and a control method for controlling the same.

Description of the Related Art

In recent years, many imaging apparatuses capable of recording a moving image are known. When a moving image is recorded, heat is generated inside an imaging apparatus. Thus, to prevent an effect on a user and protect the apparatus and the image quality, a countermeasure against the generated heat is an important issue. Particularly, due to an improvement in the image quality of an image that can be captured in recent years, a rise in the temperature inside the apparatus in a live view image capturing standby state greatly affects a decrease in a recording time due to a rise in the temperature when a moving image is recorded. Japanese Patent Application Laid-Open No. 2017-73740 discusses a technique for, when the recording of a moving image is started, determining whether the moving image can be recorded with set imaging parameters based on imaging parameters and the accumulated time of moving image recording. If it is determined that the moving image cannot be recorded with the set imaging parameters, a warning sound is emitted, and a user is notified that the moving image can be recorded with imaging parameters with less power consumption. Japanese Patent Application Laid-Open No. 2012-165372 discusses a technique for, in a case where the recording of a moving image is started, calculating the recordable time in which the moving image can be recorded in the range where the temperature does not exceed a predetermined temperature from the temperature inside a housing of an imaging apparatus, and displaying the recordable time on a display unit during the recording of the moving image.

Overview of the Invention

In Japanese Patent Application Laid-Open No. 2017-73740, however, it is determined whether the moving image can be recorded with currently set imaging parameters when the recording of a moving image is started. Thus, the user cannot know whether the moving image can be captured with the current imaging parameters before the capturing of the image is started. Even when the capturing of the image is successfully started, the user may miss an image capturing opportunity if the image can be captured only for a time shorter than a time assumed by the user. In Japanese Patent Application Laid-Open No. 2012-165372, the recordable time based on the temperature inside the housing is displayed after the recording of a moving image is started. Thus, the user cannot know how long the moving image can be recorded until the capturing of the image is started. Consequently, the user cannot know at what timing the capturing of the image should be started so that the user can capture the image for a desired length of time. Further, since the recordable time decreases even in an image capturing standby state, the user cannot determine whether the imaging apparatus should be turned off or should remain turned on.

SUMMARY OF THE INVENTION

The present invention is directed to enabling a user to recognize the time in which a moving image can be recorded while an imaging apparatus is in an image capturing standby state.

According to an aspect of the present invention, an electronic device includes an acquisition unit configured to acquire a temperature of an imaging apparatus, and at least memory and at least one processor which function as a calculation unit configured to calculate a time limit for recording a moving image based on the temperature acquired by the acquisition unit, and a control unit configured to perform control to display the time limit on a display unit in a standby state where a moving image is not recorded in a moving image recording mode.

Further features of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Suitable exemplary embodiments of the present invention will be described below with reference to the drawings.

Figure 1A:
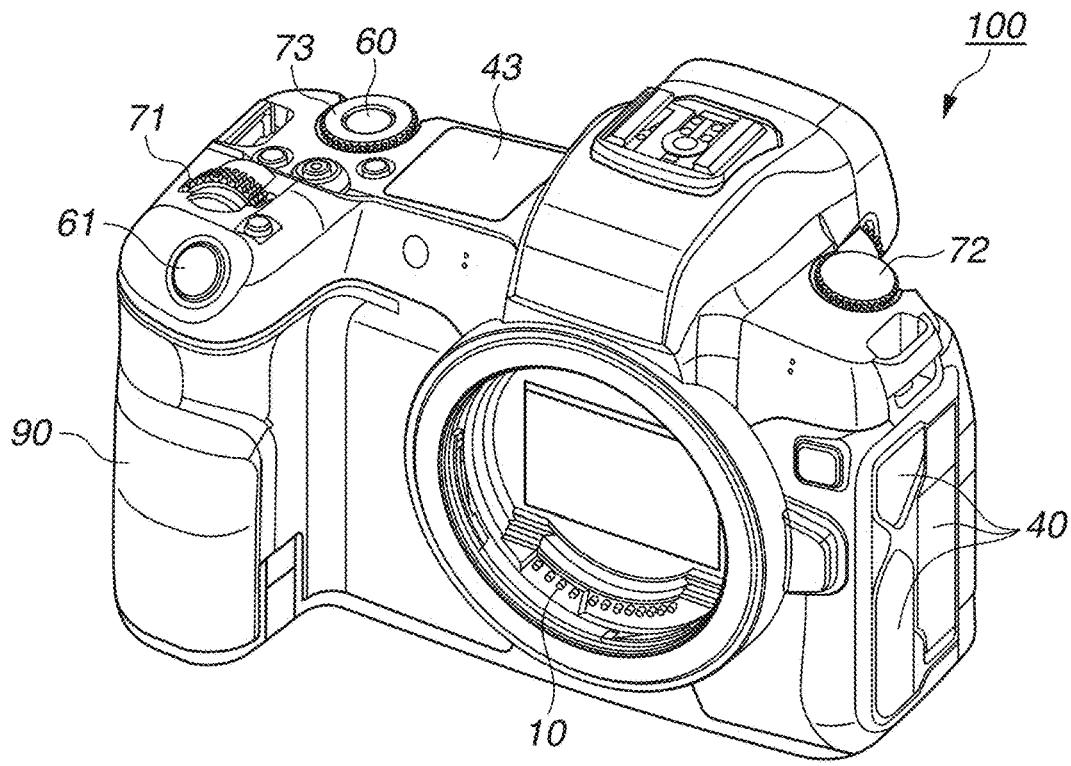
FIGS. 1A and 1B are external views of a digital camera.
Figure 1B:
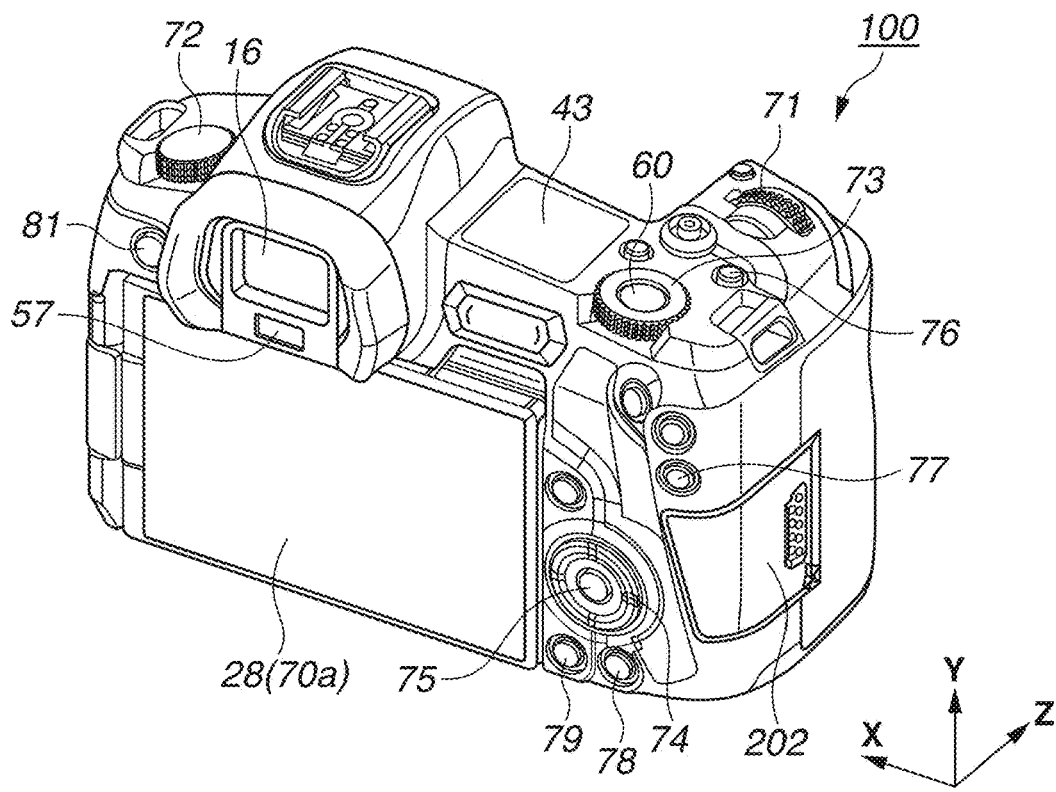

FIGS. 1A and 1B illustrate external views of a digital camera 100 as an example of an apparatus (an electronic device) to which the present invention is applicable. FIG. 1A is a front perspective view of the digital camera 100. FIG. 1B is a rear perspective view of the digital camera 100. In FIGS. 1A and 1B, a display unit 28 is a display unit that is provided on the back surface of the camera 100 and displays an image and various pieces of information. A touch panel 70a is a touch operation member and can detect a touch operation on a display surface (an operation surface) of the display unit 28. An outside-viewfinder display unit 43 is a display unit that is provided on the upper surface of the camera 100 and displays various setting values of the camera 100, such as the setting values of the shutter speed and the stop.

A shutter button 61 is an operation unit for giving an image capturing instruction. A mode selection switch 60 is an operation unit for switching various modes. A terminal cover 40 is a cover that protects a connector (not illustrated) for connecting a connection cable for an external device and the digital camera 100. A main electronic dial 71 is a rotary operation member included in an operation unit 70. The setting value of the shutter speed or the stop can be changed by rotating the main electronic dial 71. A power switch 72 is an operation member for switching the turning on and off of the digital camera 100. A sub electronic dial 73 is a rotary operation member included in the operation unit 70 and enables the movement of a selection frame or image advancement. A directional pad 74 is an operation member included in the operation unit 70 and having a push button that can be pushed in in four directions. The directional pad 74 enables an operation according to the direction in which the directional pad 74 is pressed. A SET button 75 is a push button included in the operation unit 70 and is mainly used to determine a selection item.

A moving image button 76 is used to give an instruction to start or stop the recording of a moving image. An automatic exposure (AE) lock button 77 is included in the operation unit 70. An exposure state can be fixed by pressing the AE lock button 77 in an image capturing standby state. An enlargement button 78 is an operation button included in the operation unit 70 and used to turn on and off an enlargement mode in live view display in an image capturing mode. A live view image can be enlarged and reduced by turning on the enlargement mode and then operating the main electronic dial 71. In a reproduction mode, the enlargement button 78 functions as an enlargement button for enlarging a reproduction image and increasing the enlargement ratio. A reproduction button 79 is an operation button included in the operation unit 70 and used to switch the image capturing mode and the reproduction mode. When the reproduction button 79 is pressed in the image capturing mode, the image capturing mode transitions to the reproduction mode, and the most recent image among images recorded in a recording medium 200 can be displayed on the display unit 28. A menu button 81 is included in the operation unit 70. When the menu button 81 is pressed, a menu screen where various settings can be made is displayed on the display unit 28. A user can intuitively make various settings using the menu screen displayed on the display unit 28, the directional pad 74, and the SET button 75.

A communication terminal 10 is a communication terminal for the digital camera 100 to communicate with a lens unit 150 (attachable to and detachable from the digital camera 100). An eyepiece portion 16 is an eyepiece portion of an eyepiece viewfinder (a look-in type viewfinder). The user can visually confirm a video displayed on an electronic viewfinder (EVF) 29 in the eyepiece viewfinder through the eyepiece portion 16. An eye approach detection unit 57 is an eye approach detection sensor that detects whether the eye of a photographer approaches the eyepiece portion 16. A cover 202 is a cover of a slot in which the recording medium 200 is stored. A grip portion 90 is a holding portion having a shape that makes it easy for the user to grip the holding portion with his/her right hand when the user holds up the digital camera 100. The shutter button 61 and the main electronic dial 71 are placed at the positions where the user can operate the shutter button 61 and the main electronic dial 71 with their right index finger in the state where the user holds the digital camera 100 by gripping the grip portion 90 with their right little, ring, and middle fingers. The sub electronic dial 73 is placed at the position where the user can operate the sub electronic dial 73 with their right thumb in the same state.

Figure 2:
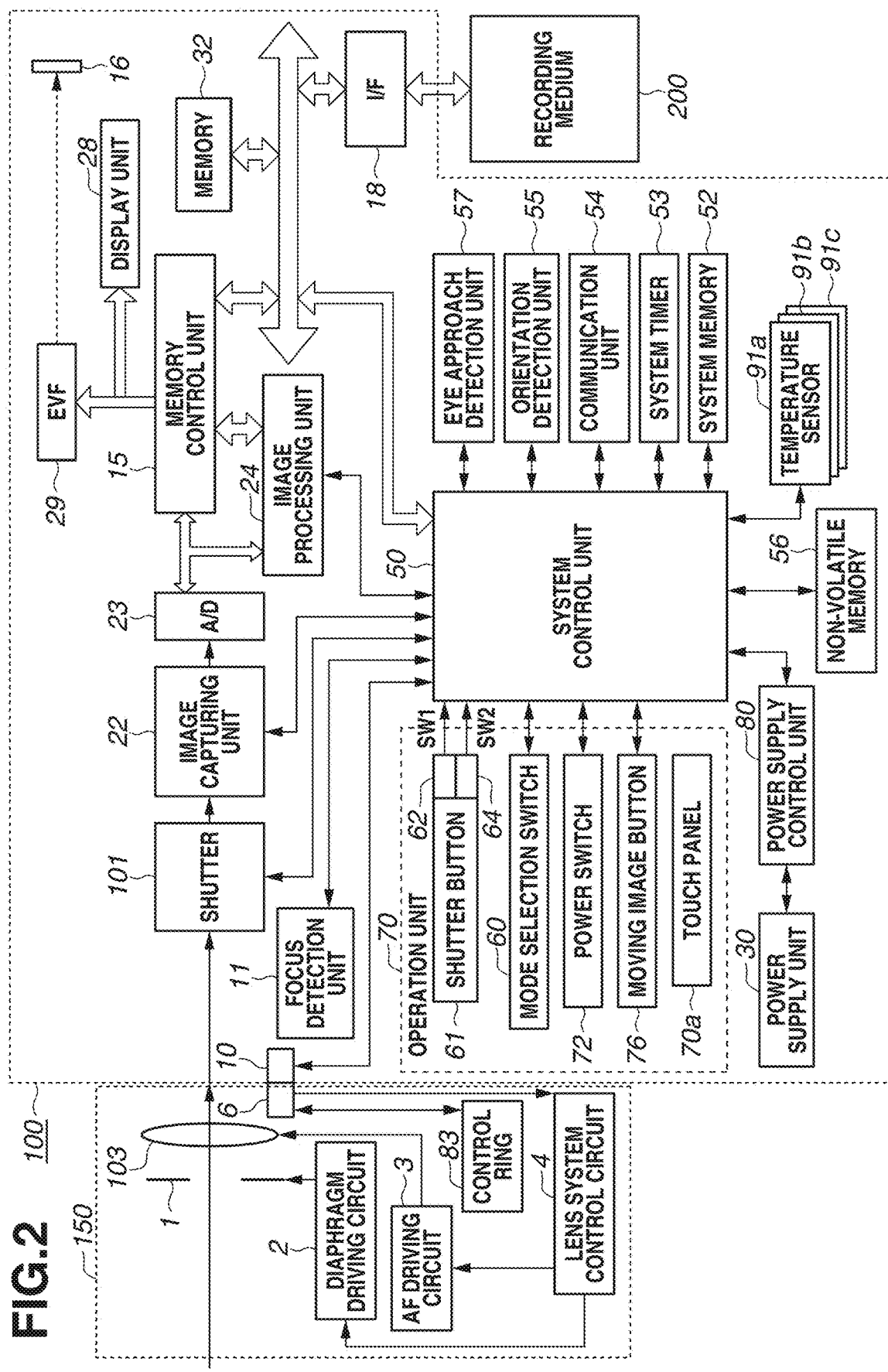
FIG. 2 is a schematic block diagram illustrating an example of a hardware configuration of the digital camera.

FIG. 2 is a block diagram illustrating an example of the configuration of the digital camera 100 according to the present exemplary embodiment. In FIG. 2, the lens unit 150 is a lens unit on which an interchangeable imaging lens is mounted. Although a lens 103 normally includes a plurality of lenses, FIG. 2 illustrates only a single lens in a simplified manner A communication terminal 6 is a communication terminal for the lens unit 150 to communicate with the digital camera 100. The lens unit 150 communicates with a system control unit 50 via the communication terminals 6 and 10, and causes a lens system control circuit 4 within the lens unit 150 to control a diaphragm 1 via a diaphragm driving circuit 2. Then, the lens unit 150 displaces the lens 103 via an autofocus (AF) driving circuit 3, thereby bringing the lens 103 into focus.

A shutter 101 is a focal-plane shutter capable of freely controlling the exposure time of an image capturing unit 22 by control of the system control unit 50.

The image capturing unit 22 is an image sensor composed of a charge-coupled device (CCD) or a complementary metal-oxide-semiconductor (CMOS) device, which converts an optical image into an electric signal. An analog-to-digital (A/D) converter 23 is used to convert an analog signal output from the image capturing unit 22 into a digital signal.

An image processing unit 24 performs a resizing process, such as predetermined pixel interpolation and reduction, and a color conversion process on data from the A/D converter 23 or data from a memory control unit 15. The image processing unit 24 performs a predetermined calculation process using captured image data. The system control unit 50 performs exposure control and distance measurement control based on the calculation result obtained by the image processing unit 24. Consequently, an AF process, an AE process, and a pre-flash (EF) process are performed by a through-the-lens (TTL) method. Further, the image processing unit 24 performs a predetermined calculation process using captured image data and performs an auto white balance (AWB) process by the TTL method based on the obtained calculation result.

The memory control unit 15 controls the transmission and reception of data between the A/D converter 23, the image processing unit 24, and a memory 32. Output data from the A/D converter 23 is written into the memory 32 via the image processing unit 24 and the memory control unit 15 or directly into the memory 32 via the memory control unit 15. The memory 32 stores image data obtained by the image capturing unit 22 and converted into digital data by the A/D converter 23 and image data to be displayed on the display unit 28 or the EVF 29. The memory 32 includes a sufficient storage capacity for storing a predetermined number of still images and a moving image and a sound of a predetermined length of time.

The memory 32 doubles as a memory for image display (a video memory). Image data for display written in the memory 32 is displayed on the display unit 28 or the EVF 29 via the memory control unit 15. The display unit 28 or the EVF 29 performs display on a display device such as a liquid crystal display (LCD) or an organic electroluminescent (EL)

display according to a signal from the memory control unit 15. Data is converted into digital data by the A/D converter 23, and the digital data is accumulated in the memory 32 and sequentially transferred to and displayed on the display unit 28 or the EVF 29, whereby the display unit 28 or the EVF 29 can perform live view display (LV display). Hereinafter, an image displayed in live view will be referred to as a "live view image (LV image)".

The outside-viewfinder display unit 43 displays various setting values of the camera 100, such as the setting values of the shutter speed and the stop, via an outside-viewfinder display unit driving circuit 44.

A non-volatile memory 56 is an electrically erasable and recordable memory. As the non-volatile memory 56, for example, a flash read-only memory (ROM) is used. The non-volatile memory 56 stores a constant for the operation of the system control unit 50 and a program. The "program" as used herein refers to a program for executing various flow charts described below in the present exemplary embodiment.

The system control unit 50 is a control unit including at least one processor or circuit and controls the entire digital camera 100. The system control unit 50 executes the above program recorded in the non-volatile memory 56, thereby achieving processes described later in the present exemplary embodiment. As a system memory 52, for example, a random-access memory (RAM) is used. A constant and a variable for the operation of the system control unit 50 and the program read from the non-volatile memory 56 are loaded into the system memory 52. The system control unit 50 also controls the memory 32 and the display unit 28, thereby performing display control.

A system timer 53 is a time measurement unit for measuring the time used for various types of control and the time of a built-in clock.

The operation unit 70 including the mode selection switch 60, a first shutter switch 62, and a second shutter switch 64 is an operation unit for inputting various operation instructions to the system control unit 50. The mode selection switch 60 is used to switch the operation mode of the system control unit 50 to either of a still image capturing mode and a moving image recording mode. The still image capturing mode includes an auto image capturing mode, an auto scene distinction mode, a manual mode, a stop priority mode (an Av mode), a shutter speed priority mode (a Tv mode), and a program AE mode (a P mode). The still image capturing mode also includes various scene modes in which image capturing settings are made according to image capturing scenes, and a custom mode. Using the mode selection switch 60, the user can directly switch to any one of these modes. Alternatively, using the mode selection switch 60, the user may once switch to a list screen of image capturing modes, then select any one of a plurality of modes displayed on the list screen, and switch to the selected mode using another operation member. Similarly, the moving image recording mode may also include a plurality of modes.

The first shutter switch 62 is turned on in an intermediate state of an operation, i.e., by a half press (an image capturing preparation instruction), on the shutter button 61 provided in the digital camera 100 and generates a first shutter switch signal SW1. Based on the first shutter switch signal SW1, the system control unit 50 starts an image capturing preparation operation such as an AF process, an AE process, an AWB process, and an EF process.

The second shutter switch 64 is turned on by the completion of an operation, i.e., by a full press (an image capturing instruction), on the shutter button 61 and generates a second shutter switch signal SW2. Based on the second shutter switch signal SW2, the system control unit 50 starts a series of operations of an image capturing process from the reading of a signal from the image capturing unit 22 to the writing of a captured image as an image file to the recording medium 200.

The operation unit 70 includes various operation members and serves as an input unit that receives operations from the user. The operation unit 70 at least includes operation members such as the shutter button 61, the touch panel 70a, the main electronic dial 71, the power switch 72, the sub electronic dial 73, the directional pad 74, the SET button 75, the moving image button 76, the AE lock button 77, the enlargement button 78, the reproduction button 79, and the menu button 81.

A power supply control unit 80 includes a battery detection circuit, a direct-current-to-direct-current (DC/DC) converter, and a switch circuit for switching blocks to which to apply a current. The power supply control unit 80 detects the presence or absence of attachment of a battery, the type of a battery, and the remaining life of a battery. The power supply control unit 80 controls the DC/DC converter based on the detection results and an instruction from the system control unit 50 and supplies a required voltage to the components including the recording medium 200 for a required period. A power supply unit 30 includes a primary battery such as an alkaline battery or a lithium battery, a secondary battery such as a nickel-cadmium (NiCd) battery, a nickel-metal hydride (NiMH) battery, or a lithium-ion (Li) battery, or an alternating current (AC) adapter.

A recording medium interface (I/F) 18 is an interface with the recording medium 200 such as a memory card or a hard disk. The recording medium 200 is a recording medium such as a memory card for recording a captured image and is a semiconductor memory or a magnetic disk.

A communication unit 54 connects to an external device wirelessly or via a cable for a wired connection, and transmits and receives a video signal and a sound signal to and from the external device. The communication unit 54 can also connect to a wireless local area network (LAN) or the Internet. The communication unit 54 can communicate with the external device also using Bluetooth (registered trademark) or Bluetooth Low Energy. The communication unit 54 can transmit an image (including a live view image) captured by the image capturing unit 22 or an image stored in the recording medium 200 to the external device and also receive an image or various other pieces of information from the external device.

An orientation detection unit 55 detects the orientation of the digital camera 100 relative to the direction of gravity. Based on the orientation detected by the orientation detection unit 55, the system control unit 50 can determine whether an image captured by the image capturing unit 22 is an image captured with the digital camera 100 held up horizontally or an image captured with the camera 100 held up vertically. The system control unit 50 can add direction information according to the orientation detected by the orientation detection unit 55 to an image file of an image captured by the image capturing unit 22 or store the image by rotating the image based on the orientation detected by the orientation detection unit 55. As the orientation detection unit 55, an acceleration sensor or a gyro sensor can be used. Using the acceleration sensor or the gyro sensor as the orientation detection unit 55, the system control unit 50 can also detect the motion of the digital camera 100 (whether the digital camera 100 is panned, tilted, lifted, or at rest).

The eye approach detection unit 57 is an eye approach detection sensor that detects (approach detection) the approach (eye approach) and the separation (eye separation) of an eye (a physical body) to and from the eyepiece portion 16 of the viewfinder. As the eye approach detection unit 57, for example, an infrared proximity sensor can be used. The eye approach detection unit 57 can detect the approach of some kind of physical body to the eyepiece portion 16 of the viewfinder having the EVF 29 built-in. If a physical body approaches, infrared light projected from a light projection portion (not illustrated) of the eye approach detection unit 57 is reflected by the physical body. Then, the reflected infrared light is received by a light reception portion (not illustrated) of the infrared proximity sensor. According to the amount of the received infrared light, it is also possible to determine at what distance from the eyepiece portion 16 the approaching physical body is (an eye approach distance). As described above, the eye approach detection unit 57 performs eye approach detection for detecting the distance from a physical body approaching the eyepiece portion 16. In a non-eye approach state (a non-approach state), if a physical body approaching the eyepiece portion 16 within a predetermined distance from the eyepiece portion 16 is detected, it is detected that the eye approaches. In an eye approach state (an approach state), if a physical body of which the approach has been detected separates from the eyepiece portion 16 at a predetermined distance or more, it is detected that the eye separates. A threshold for detecting eye approach and a threshold for detecting eye separation may be different from each other, for example, by providing hysteresis. After eye approach is detected, it is assumed that the eye approach state continues until eye separation is detected. After eye separation is detected, it is assumed that the non-eye approach state continues until eye approach is detected. The infrared proximity sensor is merely an example, and another sensor may be employed as the eye approach detection unit 57 so long as the sensor can detect the approach of the eye or a physical body that can be regarded as eye approach.

The touch panel 70a and the display unit 28 can be integrally formed. For example, the touch panel 70a is configured so that the transmittance of light does not hinder the display of the display unit 28. Then, the touch panel 70a is attached to an upper layer of the display surface of the display unit 28. Then, input coordinates on the touch panel 70a are associated with display coordinates on the display screen of the display unit 28. Consequently, it is possible to provide a graphical user interface (GUI) as if the user can directly operate a screen displayed on the display unit 28. The system control unit 50 can detect the following operations on the touch panel 70a or the following states.

The state where a finger or a pen that was not touching the touch panel 70a newly touches the touch panel 70a, i.e., the start of a touch (hereinafter referred to as a "touch-down").

The state where the finger or the pen touches the touch panel 70a (hereinafter referred to as a "touch-on").

The state of moving the finger or the pen while the finger or the pen keeps touching the touch panel 70a (hereinafter referred to as a "touch move").

The state of separating from the touch panel 70a the finger or the pen that was touching the touch panel 70a, i.e., the end of a touch (hereinafter referred to as a "touch-up").

The state where nothing touches the touch panel 70a (hereinafter referred to as a "touch-off").

If a touch-down is detected, simultaneously, a touch-on is also detected. After the touch-down, normally, the touch-on continues to be detected unless a touch-up is detected. A touch move is detected also in the state where the touch-on is detected. Even when the touch-on is detected, if the touch position does not move, a touch move is not detected. After a touch-up of all the fingers or the pen having touched the touch panel 70a is detected, a touch-off is detected.

The system control unit 50 is notified via an internal bus of these operations and states and the position coordinates where the finger or the pen touches the touch panel 70a. Based on the information of which the system control unit 50 is notified, the system control unit 50 determines what operation (touch operation) is performed on the touch panel 70a. In the case of a touch move, the system control unit 50 can also determine, based on changes in the position coordinates, the moving direction of the finger or the pen moving on the touch panel 70a with respect to each of the vertical and horizontal components on the touch panel 70a. If a touch move performed by a predetermined distance or more is detected, the system control unit 50 determines that a slide operation is performed. The operation of quickly moving the finger by some distance while the finger keeps touching the touch panel 70a, and then separating the finger from the touch panel 70a immediately after the quick movement is referred to as a "flick". In other words, the flick is the operation of quickly tracing the touch panel 70a with the finger in a flipping manner. If a touch move performed by a predetermined distance or more at a predetermined speed or more is detected, and a touch-up is detected immediately after the touch move, the system control unit 50 can determine that a flick is performed (can determine that a flick is performed following a slide operation). Further, a touch operation for simultaneously touching a plurality of places (e.g., two points) and bringing the touch positions close to each other is referred to as a "pinch-in", and a touch operation for separating the touch positions from each other is referred to as a "pinch-out". The pinch-out and the pinch-in are collectively referred to as a "pinch operation" (or simply as a "pinch"). The touch panel 70a may be a touch panel of any of various types such as a resistive type, a capacitive type, a surface acoustic wave type, an infrared type, an electromagnetic induction type, an image recognition type, and a photosensor type. There are a method for detecting the presence of a touch according to the presence of the contact of the finger or the pen with the touch panel 70a and a method for detecting the presence of a touch according to the presence of the approach of the finger or the pen to the touch panel 70a is included depending on the type. Either method can be used.

Figure 3:
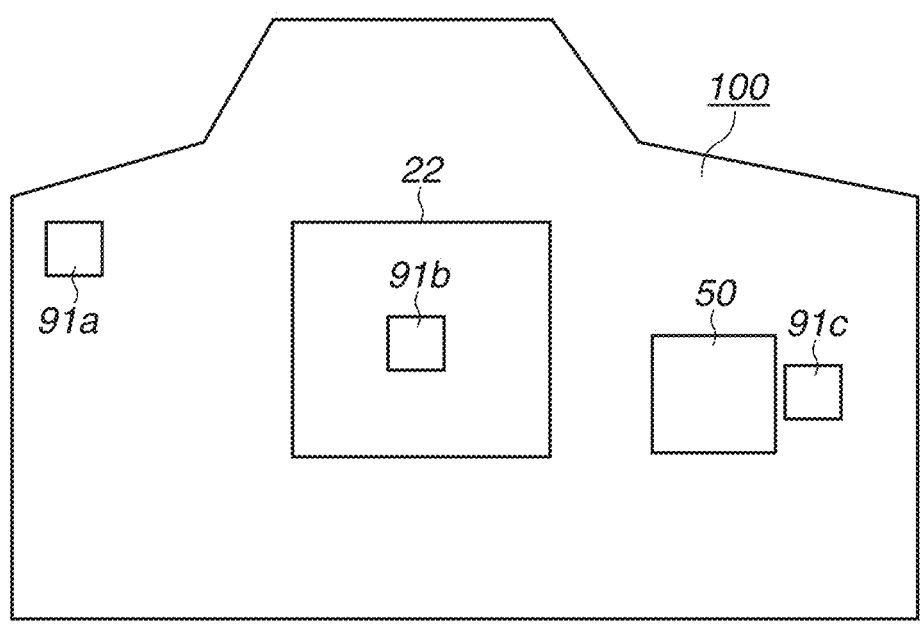
FIG. 3 is a diagram illustrating placement of temperature sensors of the digital camera according to the present exemplary embodiment.

Temperature sensors 91a, 91b, and 91c measure the temperatures of the surface and the inside of a housing of the digital camera 100. FIG. 3 illustrates examples of the placement locations of the temperature sensors 91a, 91b, and 91c. FIG. 3 is a diagram illustrating the digital camera 100 viewed from the display unit 28 side in the state where the EVF 29 faces up. The temperature sensor 91a is placed in the periphery of the connector protected by the terminal cover 40 and measures a temperature for calculating the temperature of the surface of the housing of the digital camera 100. The digital camera 100 avoids the situation where the surface of the housing reaches a certain high temperature (a temperature lower than a temperature limit for protecting devices, specifically about 46° C.), and the user has a low temperature burn by continuing to capture an image while gripping the grip portion 90 at this temperature. To this end, not only the temperatures near the devices, but also the temperature of the surface of the housing is appropriately measured. The temperature sensor 91b is placed near the image capturing unit 22, and the temperature sensor 91c is placed near the system control unit 50. The temperature sensors 91b and 91c measure the temperatures near the respective devices. If each device reaches a high temperature (e.g., 80° C. or higher), the device may not normally function, or the image quality may deteriorate. Thus, to prevent these phenomena, the temperature sensors 91b and 91c measure the temperatures. In the present exemplary embodiment, temperature sensors are placed near the image capturing unit 22 and the system control unit 50. The number of placed sensors and the placement positions of sensors, however, are not limited to these.

Figure 4:
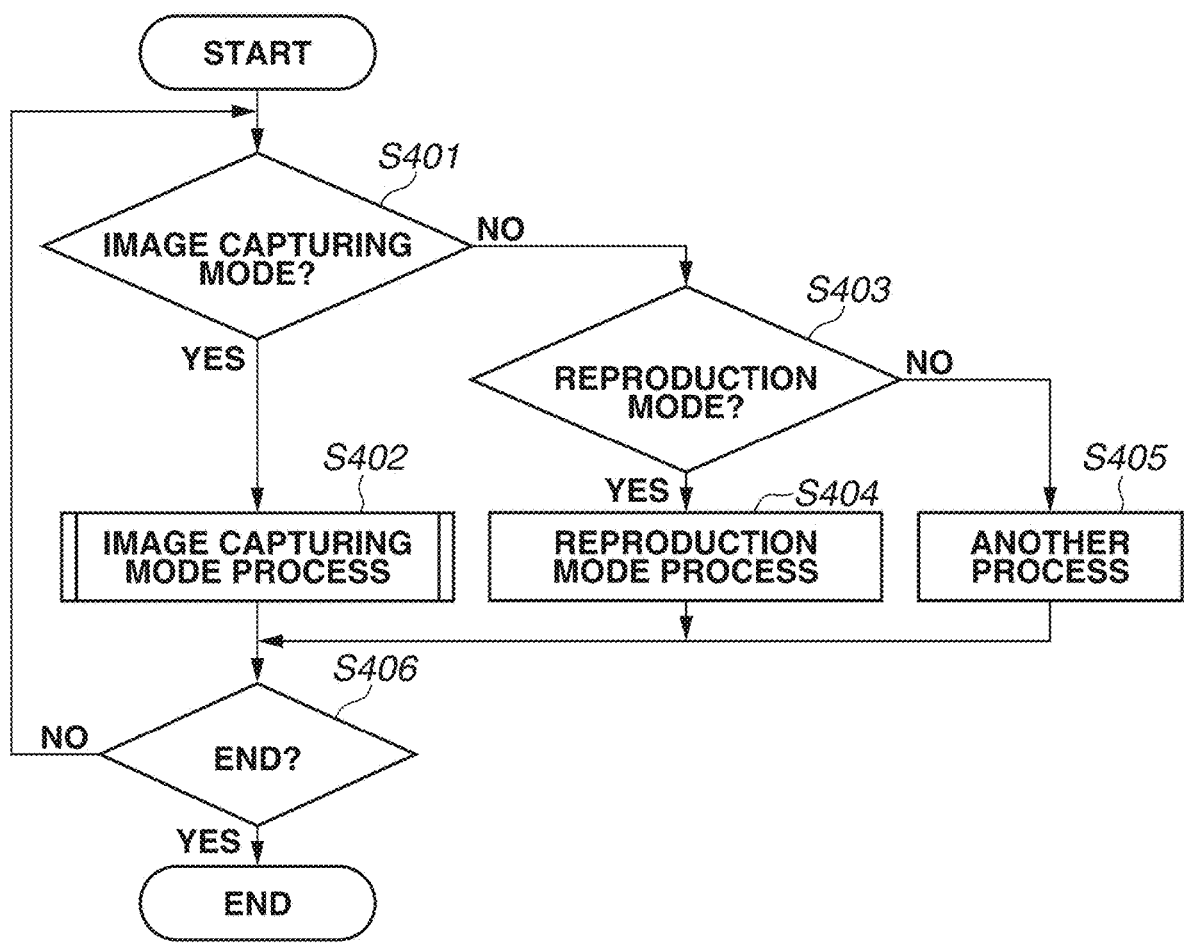
FIG. 4 is a control flowchart when the digital camera starts according to the present exemplary embodiment.

FIG. 4 is a flowchart for a control process regarding display on the display unit 28 when a moving image is recorded, and the recording of a moving image according to the present exemplary embodiment. This control process is achieved in the digital camera 100 by loading a program recorded in the non-volatile memory 56 into the system memory 52, and by the system control unit 50 executing the program. The flowchart in FIG. 4 is started when the digital camera 100 is activated (turned on). In the present exemplary embodiment, display is performed on the display unit 28 in the control process. The present invention, however, is also applicable to a case where display is performed on the EVF 29 or an external monitor.

In step S401, the system control unit 50 determines whether the current mode is the image capturing mode. If the current mode is the image capturing mode (YES in step S401), the processing proceeds to step S402. If not (NO in step S401), the processing proceeds to step S403.

In step S402, the system control unit 50 performs an image capturing mode process. The image capturing mode process will be described below with reference to FIG. 5.

In step S403, the system control unit 50 determines whether the current mode is the reproduction mode. If the current mode is the reproduction mode (YES in step S403), the processing proceeds to step S404. If not (NO in step S403), the processing proceeds to step S405.

In step S404, the system control unit 50 performs a reproduction mode process. The reproduction mode process is a control process for reproducing a captured image. Image advancement or an enlargement operation can be performed on an image reproduced on the display unit 28 by operating the operation unit 70.

In step S405, based on the determinations in steps S401 and S403, the system control unit 50 performs another process. "Another process" refers to, for example, the process of making settings regarding the digital camera 100 and image capturing on a setting menu screen.

In step S406, the system control unit 50 determines whether the process has ended. If the process has ended (YES in step S406), the control flowchart in FIG. 4 ends. If not (NO in step S406), the processing returns to step S401. The ending of the process refers to, for example, the turning off of the digital camera 100.

Figure 5A:
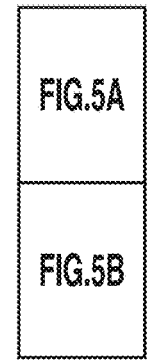
FIGS. 5A and 5B are a control flowchart for display of times in a moving image recording mode according to the present exemplary embodiment.
Figure 5A:
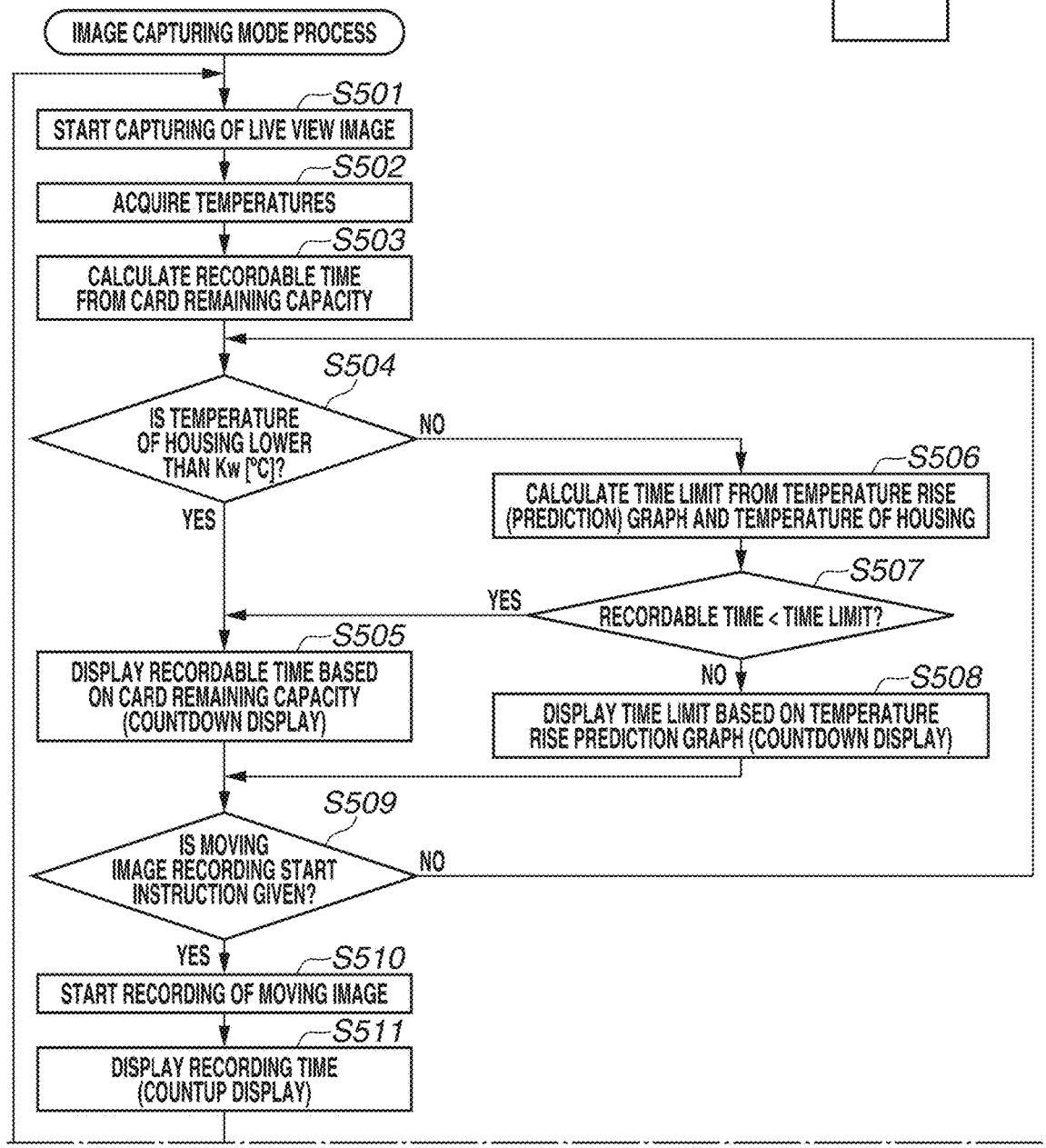
Figure 5B:
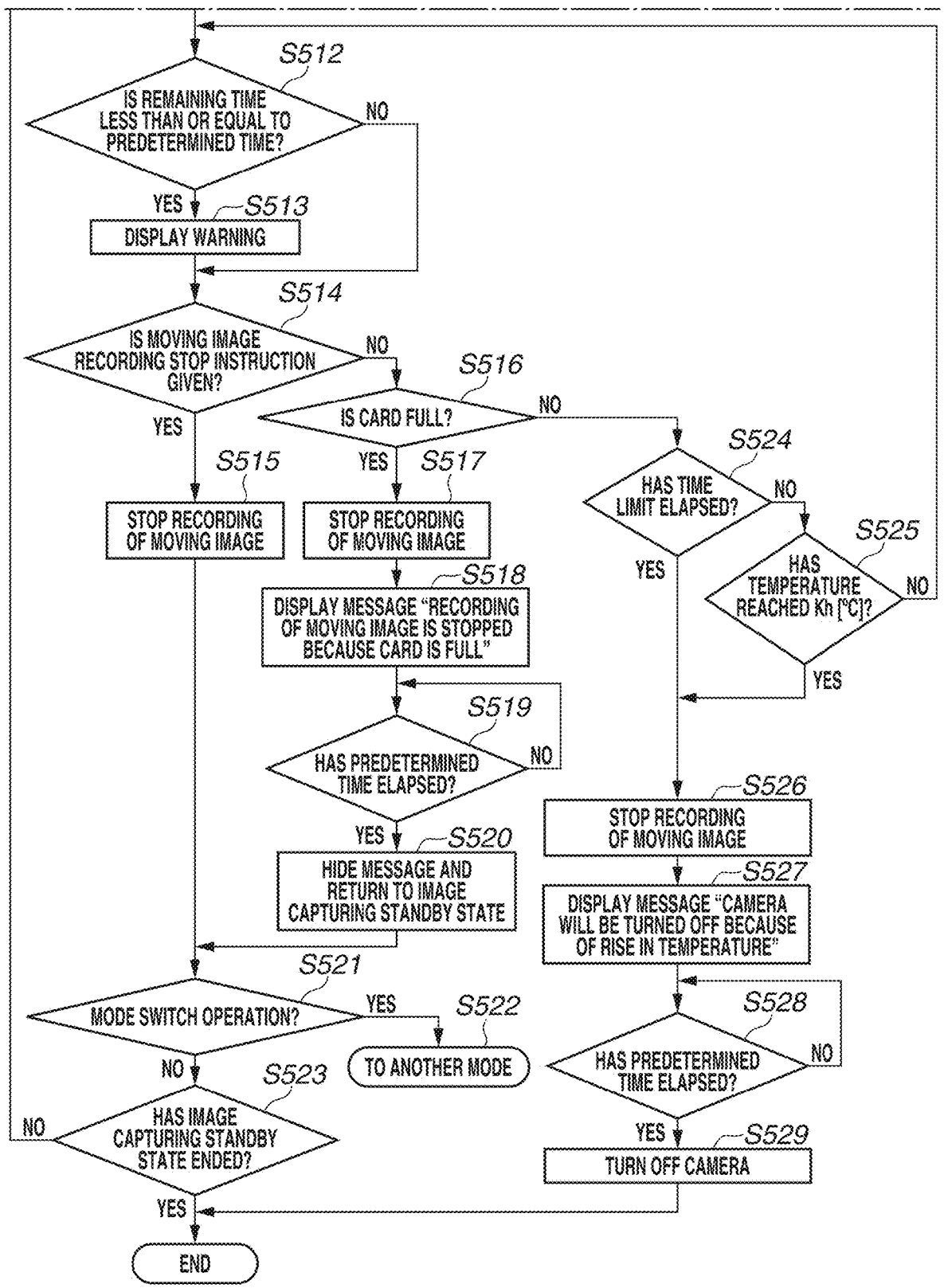

FIG. 5 is a flowchart for the image capturing mode process described in step S402 in FIG. 4. The image capturing mode process is started if the determination is YES in step S401 in the flowchart in FIG. 4, i.e., if it is determined that the current mode is the image capturing mode.

In step S501, the system control unit 50 starts the capturing of an LV image using the image capturing unit 22 and displays the LV image on the display unit 28. This state is referred to as an "image capturing standby state".

In step S502, the system control unit 50 acquires the temperatures measured by the temperature sensors 91a, 91b, and 91c from the temperature sensors 91a, 91b, and 91c. As described above, the temperature sensor 91a measures a temperature for calculating the temperature of the surface of the housing of the digital camera 100. The temperature sensor 91a manages the temperature of the surface of the housing, thereby preventing the user from being affected when the user captures an image while gripping the grip portion 90.

In step S503, the system control unit 50 calculates the recordable time of a moving image with current image quality settings (the number of recorded pixels, the frame rate, and the compression method) from the remaining recordable capacity of the recording medium 200 (hereinafter referred to as a "card remaining capacity").

In step S504, the system control unit 50 determines whether a temperature K of the surface of the housing (a temperature calculated from the temperature measured by the temperature sensor 91a) acquired in step S502 is lower than Kw [° C.]. If the temperature K is lower than Kw [° C.] (K<Kw) (YES in step S504), the processing proceeds to step S505. If not (K≥Kw) (NO in step S504), the processing proceeds to step S506. Kw [° C.] is a temperature lower than K1 [° C.] described below with reference to FIGS. 7A and 7B. K1 [° C.] is a temperature for determining a time limit to be calculated in step S506. If the temperature K of the surface of the housing is lower than Kw [° C.], it is assumed that even when the capturing of a moving image is started at that time, the temperature K of the surface of the housing does not reach K1 [° C.] by the time the recording of the moving image ends, so long as the digital camera 100 is used in a normal manner.

Figure 6A:
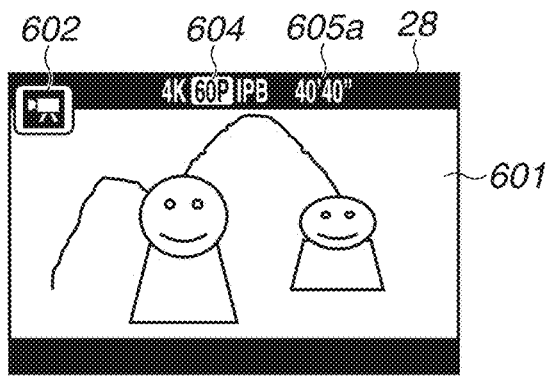
FIGS. 6A to 6G are diagrams illustrating examples of the display of the times according to the present exemplary embodiment.
Figure 6B:
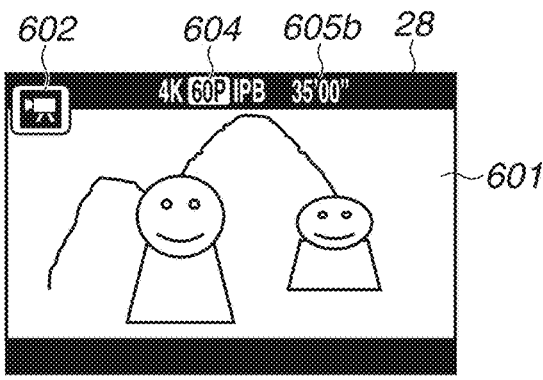
Figure 6C:
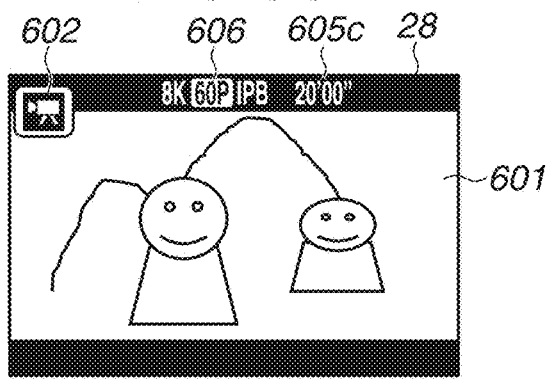

In step S505, the system control unit 50 displays the recordable time calculated from the card remaining capacity acquired in step S503 on the display unit 28 and holds the displayed recordable time in the system memory 52. Since the determination is YES in step S504, the temperature K of the surface of the housing is lower than Kw [° C.] (K<Kw). Thus, even when a moving image is recorded up to the recordable time based on the card remaining capacity and then the recording is ended, the temperature K does not reach K1 [° C.]. Thus, the recordable time based on the card remaining capacity is displayed not the time limit based on the temperature. The recordable time is displayed in a countdown format. FIGS. 6A and 6C illustrate examples of the display at this time.

In step S506, the system control unit 50 calculates a time limit regarding image capturing from the temperature K of the housing acquired in step S502 and a temperature rise prediction graph. The "temperature rise prediction graph" refers to a graph described below with reference to FIGS. 7A and 7B and is information recorded in advance in the non-volatile memory 56. Since the determination is NO in step S504, it is understood that the temperature K of the housing is higher than Kw [° C.]. Thus, if a moving image is recorded up to the recordable time based on the card remaining capacity, the temperature K of the housing may reach K1 [° C.] or higher by the time the recording of the moving image stops (ends). Thus, to prevent the user from being affected, the time limit is provided for the recording time of the moving image so that the temperature K of the housing does not reach K1 [° C.] or higher.

In step S507, based on the results of the calculations in steps S503 and S506, the system control unit 50 determines whether the time limit based on the temperature rise prediction graph is longer than the recordable time based on the card remaining capacity. If the time limit is longer (YES in step S507), the processing proceeds to step S505. If the recordable time is longer (NO in step S507), the processing proceeds to step S508. As described above, in view of an effect on the user due to the temperature K of the housing becoming high, priority is given to the time limit based on the temperature K of the housing even when much of the card remaining capacity is left.

Figure 6D:
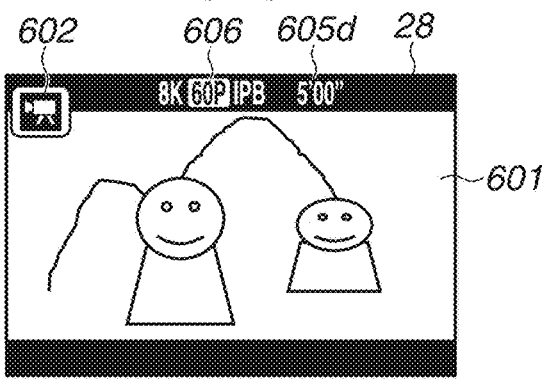

In step S508, the system control unit 50 displays the time limit based on the temperature rise prediction graph calculated in step S506 on the display unit 28 and holds the displayed time limit in the system memory 52. The time limit is displayed in a countdown format. FIGS. 6B and 6D illustrate examples of the display at this time.

FIGS. 6A to 6D illustrate examples of the display in the image capturing standby state where the LV image is displayed on the display unit 28. Together with an LV image 601, information 602, 604, 605, and 606 is displayed on the display unit 28. The information 602 indicates the setting content of the moving image recording mode, and in the present exemplary embodiment, indicates that the moving image recording mode is set to program AE. The information 604 and 606 indicates the setting contents of the moving image recording image quality. In FIGS. 6A and 6B, the information 604 indicates that the number of recorded pixels (the recording size) is 4K (3840 horizontal×2160 vertical pixels), the frame rate is 60 fps, and the compression method is IPB. In FIGS. 6C and 6D, the information 606 indicates that the number of recorded pixels is 8K (7680 horizontal× 4320 vertical pixels), the frame rate is 60 fps, and the compression method is IPB. Information 605a to 605d indicates the maximum time in which, in a case where the recording of a moving image is started with currently set parameters, the moving image can be recorded.

FIGS. 6A and 6C illustrate examples of the display in a case where only the recordable time based on the card remaining capacity needs to be taken into account instead of the time limit based on the temperature, since the determination is YES (K<Kw) in step S504 or the determination is YES in step S507. Thus, as the information 605a and 605c, the recordable time based on the card remaining capacity is displayed. The information 605a indicates that a moving image can be recorded for a maximum of 40 minutes. The information 605c indicates that a moving image can be recorded for a maximum of 20 minutes. In FIG. 6A, it is understood from the information 604 that the number of recorded pixels is 4K. In FIG. 6C, it is understood from the information 606 that the number of recorded pixels is 8K. Based on this, the number of recorded pixels set as the moving image recording image quality is greater in FIG. 6C. If the numbers of recorded pixels are different, even when moving images are recorded for the same time, the moving image with the greater number of recorded pixels uses more of the capacity of the recording medium 200. Thus, as indicated by the information 605c, the recordable time is shorter than the time indicated by the information 605a. Further, not only during the recording of a moving image, the temperatures of the surface and the inside of the housing also rise due to LV image capturing in the image capturing standby state (described below with reference to FIGS. 7A and 7B). Thus, even when the current temperature K of the surface of the housing is K<Kw, the temperature K of the surface of the housing may become K≥Kw by the digital camera 100 being in the image capturing standby state for a certain long time. While the temperature K of the surface of the housing is K<Kw, the recordable time based on the card remaining capacity is used. Accordingly, a certain recordable time is displayed unless the recording medium 200 is changed. If, however, the temperature K of the surface of the housing becomes K≥Kw due to the lapse of time in the image capturing standby state, the time limit based on the temperature needs to be taken into account. In this case, the processing returns to step S504, and the determination is made again. By such control, the user can visually confirm that a moving image can be recorded up to the recordable time based on the card remaining capacity.

FIGS. 6B and 6D illustrate examples of the display in a case where the time limit based on the temperature is displayed since the determination is NO (K≥Kw) in step S504 and the determination is NO in step S507. FIG. 6B illustrates the same contents as the setting contents of the moving image recording image quality in FIG. 6A, and the information 605b indicates the maximum time limit (35 minutes in this case) in a case where the recording of a moving image is started with the currently set parameters. As compared with the information 605a in FIG. 6A, since the time limit until the temperature K of the surface of the housing reaches K1 [° C.] is taken into account, the time displayed on the display unit 28 decreases (becomes shorter) from 40 minutes to 35 minutes. Similarly, FIG. 6D illustrates the same contents as the setting contents of the moving image recording image quality in FIG. 6C, and the information 605d indicates the maximum time limit (five minutes in this case) in a case where the recording of a moving image is started with the currently set parameters. As compared with the information 605c in FIG. 6C, since the time limit based on the temperature is taken into account, the displayed time decreases from 20 minutes to five minutes. If the amounts of change in the displayed time (the time in which a moving image can be recorded) from FIG. 6A to FIG. 6B and from FIG. 6C to FIG. 6D are compared with each other, the greater the number of recorded pixels as the moving image recording image quality is, the greater the amount of change in the time in which a moving image can be recorded is. This is because the greater the number of pixels to be recorded is, the more load the process for recording the moving image (e.g., the compression and the writing of the moving image) requires. As a result, more heat is generated in the devices, and the degrees of rises in the temperatures of the surface and the inside of the housing increase (described below with reference to FIGS. 7A and 7B). Thus, in a case where the number of recorded pixels is 8K as illustrated in FIG. 6D, the digital camera 100 is more affected by temperature due to heat generation, and the time limit is shorter than in a case where the number of recorded pixels is 4K as illustrated in FIG. 6B. In the first place, if the number of recorded pixels is great, the time in which a moving image can be recorded is short without even taking into account the time limit based on the temperature. Thus, it can be assumed that the user feels that the time in which recording can be performed is even shorter. The time in which a moving image can be recorded in the image capturing standby state is displayed, whereby the user can visually confirm how long a moving image can be recorded with the current settings and in the current state. Consequently, the user can choose the timing to start the recording of a moving image, by taking into consideration whether the image can be captured until a desired timing even when the user starts the recording of the moving image now, or whether the image at a timing desired by the user can be captured if the user starts the recording of the moving image later, or whether the digital camera 100 should be turned off until the user starts the recording of the moving image.

In step S509, the system control unit 50 determines whether a moving image recording start instruction is given. If the moving image recording start instruction is given (YES in step S509), the processing proceeds to step S510. If not (NO in step S509), the processing returns to step S504. The "moving image recording start instruction" refers to, for example, the pressing of the moving image button 76, or a touch on a touch button for giving an instruction to start the recording of a moving image provided in an apparatus capable of performing remote control.

In step S510, the system control unit 50 starts the recording of a moving image. That is, the system control unit 50 creates a moving image file in the recording medium 200 and records a moving image captured by the image capturing unit 22 with the current setting contents. The system control unit 50 also saves the recordable time displayed in step S505 or the time limit displayed in step S508 in the system memory 52. That is, it is possible to avoid a decrease in the time limit due to an abnormal rise in the temperature K of the surface of the housing during the recording of the moving image, and record the moving image for the recordable time displayed in step S505 or the time limit displayed in step S508. Consequently, the user can record the moving image for the length of time visually confirmed when the recording of the moving image is started. Thus, it is possible to prevent the situation where the recording of the moving image stops in a time shorter than the time assumed before the recording of the moving image is started, causing confusion for the user.

Figure 6E:
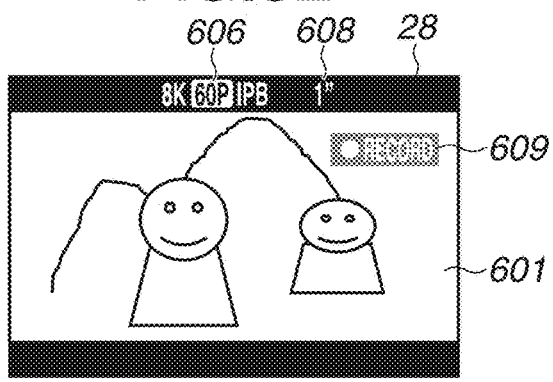

In step S511, the system control unit 50 displays a recording time together with the LV image. The "recording time" refers to the recording completion time in which the moving image is recorded after the recording of the moving image is started in step S510 (the time elapsed after the recording of the moving image is started). At this time, the recording time is displayed in a count-up format. FIG. 6E illustrates an example of the display. FIG. 6E illustrates an example of the display in a case where the recording of the moving image is started in response to the moving image recording start instruction in the image capturing standby state illustrated in FIG. 6C or 6B (a recording state). The recording time of the moving image is displayed as information 608. In FIG. 6E, since the information 608 indicates one second, it is understood that one second has elapsed after the moving image recording start instruction is given (the moving image is recorded for one second). Information 609 indicates that the moving image is being recorded. The present invention, however, is not limited to this. Since it is only necessary to be able to notify the user that the moving image is being recorded, the notification may be made by the blinking of a red point without displaying the word "record". The information 602 and 605a to 605d illustrated in FIGS. 6A to 6D is not displayed after the recording of the moving image is started.

In step S512, the system control unit 50 determines whether the remaining time in which the moving image can be recorded is less than or equal to a predetermined time. If the remaining time is less than or equal to the predetermined time (YES in step S512), the processing proceeds to step S513. If not (NO in step S512), the processing proceeds to step S514. The remaining time in this case is obtained by subtracting the recording time from the time saved in the system memory 52 when the recording of the moving image is started in step S510. The predetermined time in the present exemplary embodiment is three minutes, for example.

Figure 6F:
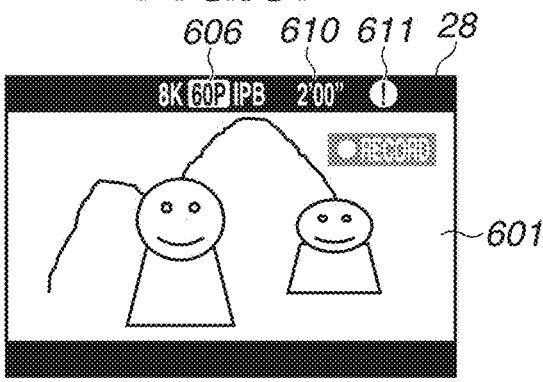

In step S513, the system control unit 50 displays a warning. Since the determination is YES in step S512, the remaining time in which the moving image can be recorded is less than or equal to the predetermined time. Thus, the system control unit 50 notifies the user that after the lapse of the predetermined time, the recording of the moving image will stop without an operation of the user. The display of the warning enables the user to recognize that the time in which the image can be captured is running out. FIG. 6F illustrates an example of the display of the warning. In this case, a warning icon (an exclamation mark icon 611) is displayed next to the recording time displayed together with the LV image. In FIG. 6F, it is understood from information 610 that two minutes have elapsed after the recording of the moving image is started (the recording time is two minutes). The state illustrated in FIG. 6F corresponds to a case where the recording of the moving image is started in response to the moving image recording instruction in the image capturing standby state illustrated in FIG. 6D. Thus, it is understood that if two minutes, which is the recording time, is subtracted from five minutes, which is the time saved in the system memory 52 in step S510 and displayed on the display unit 28, the remaining time (the remaining recording time) is three minutes or less. Thus, as described above, a warning as indicated by the icon 611 is displayed. Consequently, the user can choose either to continue to capture the image or temporarily stop the recording of the moving image and start the capturing of the image again at a desired timing.

In step S514, the system control unit 50 determines whether a moving image recording stop instruction is given. If the stop instruction is given (YES in step S514), the processing proceeds to step S515. If not (NO in step S514), the processing proceeds to step S516. Specifically, the "moving image recording stop instruction" refers to the pressing of the moving image button 76.

In step S515, the system control unit 50 stops the recording of the moving image. When the capturing of the image is stopped, the system control unit 50 performs a close process (the assignment of attribute information) on the moving image file created in the recording medium 200. As the moving image recording stop instruction in step S514, the pressing of the moving image button 76 has been described. Further, the system control unit 50 stops the recording of the moving image and performs a control process corresponding to each operation in a case where a mode switch operation is performed, or the reproduction button 79 is pressed (an instruction to transition to the reproduction mode process), or the power switch 72 is operated.

In step S516, the system control unit 50 determines whether the capacity of the recording medium 200 is full (the card is full). If the card is full (YES in step S516), the processing proceeds to step S517. If not (NO in step S516), the processing proceeds to step S524.

In step S517, similarly to step S515, the system control unit 50 stops the recording of the moving image.

In step S518, the system control unit 50 displays a message "recording of moving image is stopped because card is full". The recording of the moving image is stopped against the user's intention since the determination is YES in step S516. Thus, the system control unit 50 notifies the user of the reason why the recording of the moving image has been stopped, and a message indicating that the recording of the moving image has been stopped. The display of the message at this time may be display as indicated by a message 613 and a dialog box 614 in FIG. 6G, or may be another type of display. Specifically, when the recording of the moving image is stopped, a warning icon indicating that the recording of the moving image has been stopped may be displayed in an enlarged manner. Then, in response to an operation of the user, the reason why the recording is stopped may be displayed. Consequently, the user can visually confirm that the recording of the moving image has been stopped. Further, the user can also know the reason for the stop. Thus, it is understood that if the user wishes to start the recording of the moving image again, the user needs to replace the recording medium 200. The message displayed in this step is not limited to the above so long as the message has a content capable of notifying the user that the capacity of the recording medium 200 is full.

In step S519, the system control unit 50 determines whether a predetermined time has elapsed. If the predetermined time has elapsed (YES in step S519), the processing proceeds to step S520. If not (NO in step S519), the processing returns to step S519. The predetermined time in the present exemplary embodiment is approximately five seconds.

In step S520, the system control unit 50 hides the message displayed in step S518 and transitions to the image capturing standby state. In the present exemplary embodiment, the condition for transitioning to the image capturing standby state after the message is displayed is the lapse of the predetermined time. The present invention, however, is not limited to this. Specifically, after the message is displayed in step S518, if the user performs an operation on any of the operation members of the operation unit 70 (e.g., an operation on the directional pad 74), it is assumed that the user visually confirms the message. Then, the system control unit 50 may hide the message and transition to the image capturing standby state.

In step S521, the system control unit 50 determines whether a mode switch operation has been performed. If the mode switch operation has been performed (YES in step S521), the processing proceeds to step S522. If not (NO in step S521), the processing proceeds to step S523. The "mode switch operation" refers to the pressing of the reproduction button 79 or the menu button 81. For example, if the reproduction button 79 is pressed, the system control unit 50 transitions to the reproduction mode process for reproducing a captured image. If the menu button 81 is pressed, the system control unit 50 transitions to the setting menu screen.

In step S522, the system control unit 50 performs a control process for another mode process. The system control unit 50 performs a control process as described above in step S404 or S405.

In step S523, the system control unit 50 determines whether the image capturing standby state has ended. For example, if the image capturing standby state has ended by turning off of the digital camera 100 (YES in step S523), the control flowchart in FIG. 5 ends, and the processing proceeds to step S406 in FIG. 4. If not (NO in step S523), the processing returns to step S501.

In step S524, the system control unit 50 determines whether the time limit displayed in step S508 has elapsed from the time when the recording of the moving image is started. The time limit in this case is held in step S508, saved in the system memory 52 in step S510, and displayed on the display unit 28. If the time limit has elapsed (YES in step S524), the processing proceeds to step S526. If not (NO in step S524), the processing proceeds to step S525.

In step S525, the system control unit 50 determines whether the temperature of the inside of the housing has reached Kh [° C.]. If the temperature has reached Kh [° C.] (YES in step S525), the processing proceeds to step S526. If not (NO in step S525), the processing returns to step S512. The temperature used in this step is the temperature measured using the temperature sensor 91b or 91c. As described above, if the temperature measured by the temperature sensor 91b or 91c exceeds Kh [° C.] (e.g., 80° C.), the device may not normally function, or the image may deteriorate.

In step S526, similarly to step S515, the system control unit 50 stops the recording of the moving image. Since the determination is YES in step S525, the system control unit 50 stops the recording of the moving image to protect the device or the image.

Figure 6G:
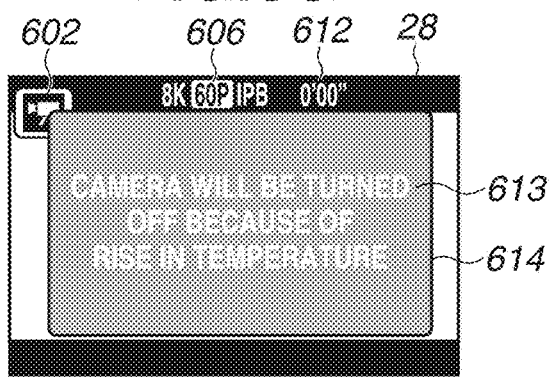

In step S527, the system control unit 50 displays a message "camera will be turned off because of rise in temperature". FIG. 6G illustrates an example of the display at this time. In FIG. 6G, the information icons displayed in the image capturing standby state are displayed. That is, the information 602 and 605a to 605d hidden during the recording of the moving image in the present exemplary embodiment (information 612 in FIG. 6G) is displayed again. The information 605a to 605d (the information 612 in FIG. 6G) is displayed again, whereby the user can visually confirm the time in which the moving image can be recorded, again. In step S527, "0 minutes" is displayed as in the information 612, whereby the user can know that the moving image cannot be resumed in the current state. Further, the dialog box 614 is displayed in a superimposed manner on the LV image, and the message 613 is displayed in the dialog box 614. Since the determination is YES in step S524 or S525, the temperature of the surface of the housing or the temperature of the inside of the housing may reach a particular temperature, and the user may be affected, or a failure may occur in the function of the device. To prevent these events, the system control unit 50 stops the recording of the moving image and notifies the user that the recording of the moving image has been stopped. In step S518, the system control unit 50 only needs to notify the user that the recording of the moving image has been stopped, notify the user of the reason for the stop, and return to the image capturing standby state. In the present step, however, the system control unit 50 notifies the user that the recording of the moving image has been stopped, and turns off the digital camera 100. This is because, if the recording of the moving image is stopped due to temperature, the highest priority is to lower the temperatures of the surface and the inside of the housing as quickly as possible. Thus, the temperatures can be lowered quickly by turning off the digital camera 100 (described below with reference to FIGS. 7A and 7B). Thus, the message as described above is displayed. In FIG. 6G, the dialog box 614 is displayed in most of a display area of the display unit 28. The present invention, however, is not limited to this. That is, the dialog box 614 may not be superimposed exactly on the LV image, or the dialog box 614 may be made smaller.

In step S528, similarly to step S519, the system control unit 50 determines whether a predetermined time has elapsed. If the predetermined time has elapsed (YES in step S528), the processing proceeds to step S529. If not (NO in step S528), the processing returns to step S528.

In step S529, the system control unit 50 turns off the digital camera 100, and the control flowchart in FIG. 5 ends (the processing proceeds to step S406 in FIG. 4). As described in step S527, if the recording of the moving image is stopped due to temperature, the temperatures of the surface and the inside of the housing drop more quickly by turning off the digital camera 100 than by transitioning to the image capturing standby state. Thus, the digital camera 100 is turned off without an operation of the user. If the user performs an operation on the power switch 72, the digital camera 100 is turned off even when the predetermined time has not elapsed in step S528.

Figure 7A:
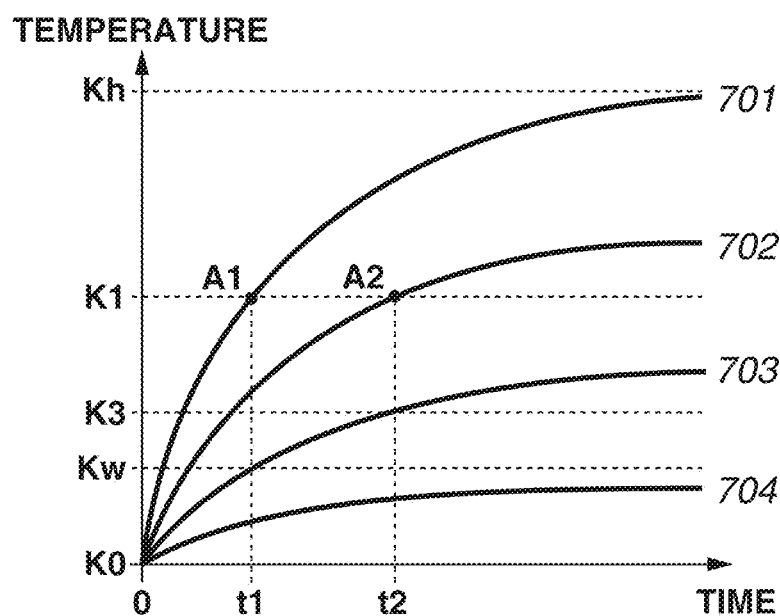
FIGS. 7A and 7B are graphs regarding setting contents of the digital camera and a rise in temperature according to the present exemplary embodiment.
Figure 7B:
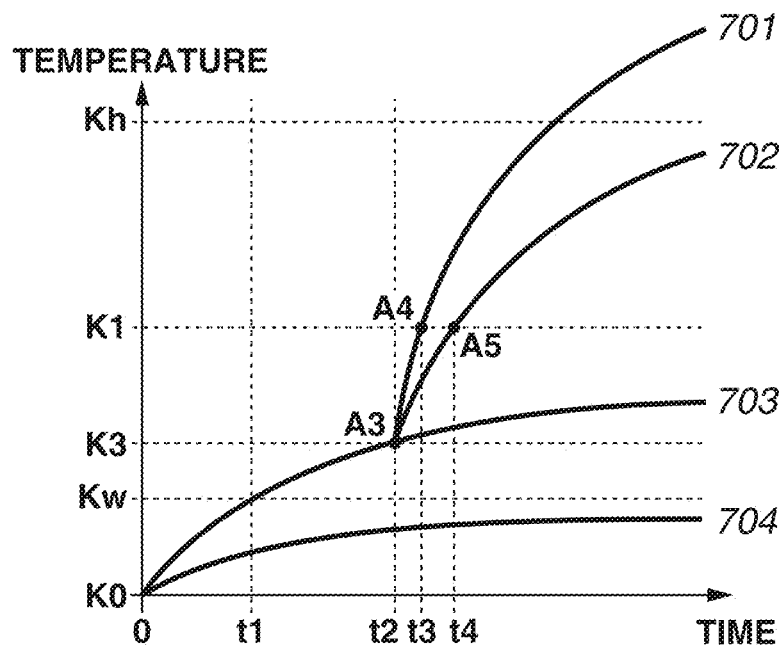

FIGS. 7A and 7B are graphs regarding the setting states of moving image recording and a rise in the temperature of the housing according to the present exemplary embodiment. FIG. 7A illustrates temperature rise curves in four states. A curve 701 is a temperature rise curve in a case where the number of recorded pixels is the 8K setting. A curve 702 is a temperature rise curve in a case where the number of recorded pixels is the 4K setting. A curve 703 is a temperature rise curve in the image capturing standby state. A curve 704 is a temperature rise curve in a mode other than the image capturing mode, i.e., the reproduction mode. The frame rate settings for the curves 701 and 702 are the same. If the frame rate increases, more heat is released. That is, between 60 fps and 120 fps, more heat is released at 120 fps. In the graph in FIG. 7A, the horizontal axis represents time, and the vertical axis represents temperature. The graph in FIG. 7A indicates temperature rise curves in the state where the digital camera 100 is turned on when the time is 0 sec and the temperature of the surface of the housing is K0 [° C.]. A temperature Kh [° C.] is the same as the temperature used in the determination in step S525. That is, the temperature Kh [° C.] is a temperature limit for protecting the devices. A temperature K1 [° C.] is a temperature limit for calculating the time limit in step S506. The time until the curve 701 reaches the temperature K1 [° C.] is t1 [sec]. The time until the curve 702 reaches the temperature K1 [° C.] is t2 [sec]. As can be seen from FIG. 7A, immediately after the digital camera 100 is turned on, with the 8K setting, the time t1 is displayed at the position of the information 605 in FIG. 6A. With the 4K setting, the time t2 is displayed. This, however, is merely the time in which a moving image can be recorded immediately after the digital camera 100 is turned on. After the digital camera 100 is turned on, the longer the image capturing standby state continues, the higher the temperature rises as indicated by the curve 703, and the shorter the time in which a moving image can be recorded is. Thus, the time in which a moving image can be recorded is a time shorter than the time t1 or t2 (described below with reference to FIG. 7B).

FIG. 7B illustrates a graph corresponding to the state where the digital camera 100 is turned on when the time is 0 sec and the temperature of the surface of the housing is K0 [° C.], and the recording of a moving image is started at a point A3 which is indicated by the curve 703 and at which the time t2 has elapsed in the image capturing standby state. At the point A3, the temperature of the surface of the housing is K3. As described in FIG. 7A, immediately after the digital camera 100 is turned on, the time t1 is displayed as the time in which a moving image can be recorded with the 8K setting. However, after the time t2 elapses in the image capturing standby state, the time in which a moving image can be recorded with the 8K setting is t3−t2, and the time in which a moving image can be recorded with the 4K setting is t4−t2 (t2<t3<t4). That is, even when a moving image is not recorded and LV image capturing is performed, the temperatures of the surface and the inside of the housing rise, and the time limit based on the temperature becomes shorter moment by moment. On the other hand, with a full high definition (FHD) setting or a high definition (HD) setting, heat is not generated as much as with the 8K setting or the 4K setting, and a restriction due to temperature is less likely to be placed. Thus, with the FHD setting or the HD setting, even when the user waits for an image capturing timing in the image capturing standby state, the subsequent recording of a moving image is not greatly affected.

If the curves 701 and 702 reach points A1 and A2, respectively, in FIG. 7A, and the curves 701 and 702 reach points A4 and A5, respectively, in FIG. 7B, and the digital camera 100 is turned off as described above in steps S526 to S529, the temperatures of the surface and the inside of the housing drop. Every time the temperature of the housing drops by 1° C., the maximum recordable time extends by approximately one minute. That is, in a case where the user turns on the digital camera 100 after the digital camera 100 is turned off in step S529, if the temperature of the housing drops by 1° C., the time limit extends by approximately one minute. If the temperature of the housing drops by 5° C., the time limit extends by approximately five minutes. However, if the digital camera 100 is turned off in a case where the determination is YES in step S525, the time limit does not extend even when the temperature drops by 1° C. unless the temperature measured by the temperature sensor 91a falls below K1 [° C.]. This is because, the temperature of the surface of the housing is likely to be K1 [° C.] or higher and may affect the user even when the temperature is lower than Kh [° C.] but K1 [° C.] or higher. Thus, if the digital camera 100 is turned off due to the temperature exceeding the temperature Kh [° C.], the recording of a moving image is not started even when a moving image recording instruction is given unless the temperature measured by the temperature sensor 91a falls below the temperature Kw [° C.] in step S504.

According to the present exemplary embodiment, in a case where the user attempts to record a moving image, the user can recognize how long the moving image can be recorded with current settings before giving a moving image recording instruction. In a case where heat is generated only by the digital camera 100 being in the image capturing standby state and the time in which a moving image can be recorded becomes shorter, it is easy for the user to make either of the following determinations.

Whether the user can turn on the digital camera 100 before giving a moving image recording instruction, and wait for a recording timing in the image capturing standby state.

Whether the user should wait in the state where the digital camera 100 is turned off before giving a moving image recording instruction, turn on the digital camera 100 slightly before a timing desired by the user, and start the recording of a moving image.

Consequently, it is possible to avoid inconvenience where the user cannot record a moving image as much as assumed, or cannot continue to record a moving image to a desired timing.

The various types of control performed by the system control unit 50 in the description may be performed by a single piece of hardware, or the processing may be shared by a plurality of pieces of hardware (e.g., a plurality of processors or circuits), thereby controlling the entire apparatus.

While the present invention has been described in detail based on its suitable exemplary embodiments, the present invention is not limited to these specific exemplary embodiments. The present invention also includes various forms without departing from the spirit and scope of the invention. Further, the above exemplary embodiments merely illustrate exemplary embodiments of the present invention, and can also be appropriately combined together.

In the above exemplary embodiments, a case has been described where the present invention is applied to the digital camera 100 (an electronic device) as an example. The present invention, however, is not limited to this example, and is applicable to any electronic device capable of connecting to an imaging apparatus including an image capturing unit that can record a moving image. That is, the present invention is applicable to a personal computer, an external monitor, a mobile phone terminal, a mobile image viewer, a music player, or a game apparatus.

The present invention is applicable not only to an imaging apparatus main body but also to a control apparatus that communicates with an imaging apparatus (including a network camera) via wired or wireless communication and remotely controls the imaging apparatus main body. Examples of the apparatus that remotely controls the imaging apparatus include apparatuses such as a smartphone, a tablet personal computer (PC), and a desktop PC. Based on operations performed in the control apparatus or processes performed in the control apparatus, the control apparatus transmits, to the imaging apparatus, commands to perform various operations and make various settings, whereby the control apparatus can remotely control the imaging apparatus. Further, the control apparatus may receive a live view image captured by the imaging apparatus via wired or wireless communication and display the live view image.

Other Exemplary Embodiments

The present invention can be achieved also by performing the following process. This is the process of supplying software (a program) for achieving the functions of the above exemplary embodiments to a system or an apparatus via a network or various storage media, and of causing a computer (or a central processing unit (CPU) or a microprocessor unit (MPU)) of the system or the apparatus to read and execute a program code. In this case, the program and a storage medium that stores the program constitute the present invention.

According to the present invention, a user can recognize the time in which a moving image can be recorded in an image capturing standby state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-048158, filed Mar. 18, 2020, which is hereby incorporated by reference herein in its entirety.

What is claimed is:

1. An electronic device comprising:
an acquisition unit configured to acquire a temperature of an imaging apparatus; and
at least one processor; and
a memory coupled to the at least one processor, the memory having instructions that, when executed by the processor, cause the processor to function as:
a calculation unit configured to calculate a time limit for recording a moving image based on the temperature acquired by the acquisition unit; and
a control unit configured to perform control, in a standby state where a moving image is not recorded in a moving image recording mode, to update the time limit based on the calculated time limit and an elapsed time without using the temperature of the imaging apparatus when the time limit is updated and to display the updated time limit on a display unit; wherein, in the standby state, the control unit performs control to compare the time limit calculated by the calculation unit and a recordable time calculated based on a remaining capacity of a recording medium for recording a moving image, to display the recordable time in a case where the recordable time is shorter, and to display the updated time limit in a case where the calculated time limit is shorter.

2. The electronic device according to claim 1, wherein the control unit performs control to display the updated time limit on the display unit together with a live view image that is being captured by an image capturing unit of the imaging apparatus.

3. The electronic device according to claim 1, wherein the calculation unit calculates the time limit based on the temperature acquired by the acquisition unit and an image quality setting of a moving image to be recorded.

4. The electronic device according to claim 1, wherein, in a recording state where a moving image is recorded in the moving image recording mode, the control unit performs control to stop the recording of the moving image in response to a lapse of the time limit displayed on the display unit in the standby state from a time when the recording of the moving image is started.

5. The electronic device according to claim 4, wherein, in a case where the recording of the moving image is stopped in response to the lapse of the displayed time limit, the control unit performs control to display on the display unit a notification indicating that the recording of the moving image is stopped, and then turn off the imaging apparatus in response to a lapse of a predetermined time.

6. The electronic device according to claim 1, wherein, in a case where recording of a moving image is stopped in response to a lapse of the recordable time, the control unit performs control to display on the display unit a notification indicating that the recording of the moving image is stopped, and then, in response to satisfaction of a predetermined condition, transition to the standby state.

7. The electronic device according to claim 1, wherein, in a case where the standby state transitions to a recording state where a moving image is recorded in response to a recording start instruction being given by a user, the control unit performs control to display a time elapsed after the recording start instruction is given, as a recording time on the display unit in place of the time limit displayed in the standby state.

8. The electronic device according to claim 7, wherein the control unit performs control to display the elapsed time displayed in the recording state in a count-up format.

9. The electronic device according to claim 1,
wherein the calculation unit calculates as the time limit a time until the temperature of the imaging apparatus reaches a first temperature, and
wherein, in a case where the temperature acquired by the acquisition unit reaches a second temperature higher than the first temperature in a recording state where a moving image is recorded, the control unit performs control to stop the recording of the moving image even in a case where the time limit has not elapsed.

10. The electronic device according to claim 9, wherein the first temperature is 46° C.

11. The electronic device according to claim 9, wherein the second temperature is 80° C.

12. The electronic device according to claim 1,
wherein the calculation unit calculates as the time limit a time until the temperature of the imaging apparatus reaches a first temperature, and
wherein, in a case where the temperature acquired by the acquisition unit is a temperature lower than a third temperature lower than the first temperature in the standby state, the control unit performs control to display, between the time limit and the recordable time, the recordable time on the display unit regardless of the time limit.

13. The electronic device according to claim 12, wherein the third temperature is 15° C.

14. The electronic device according to claim 1, further comprising:
an image capturing unit; and
a viewfinder,
wherein the display unit is visually confirmed within the viewfinder, and
wherein the acquisition unit acquires the temperature of the imaging apparatus including the image capturing unit.

15. The electronic device according to claim 1,
wherein the display unit is provided in an electronic device different from the imaging apparatus including an image capturing unit, and
wherein the acquisition unit acquires the temperature of the imaging apparatus including the image capturing unit.

16. The electronic device according to claim 1, further comprising a communication unit configured to communicate with the imaging apparatus,
wherein the control unit remotely controls the imaging apparatus via the communication unit.

17. The electronic device according to claim 1,
wherein the calculation unit calculates the time limit based on the temperature acquired by the acquisition unit in response to the imaging apparatus being tuned on, and
wherein the control unit does not acquire temperature information from the acquisition unit when the time limit is updated.

18. The electronic device according to claim 1,
wherein the acquisition unit is capable of acquire a housing surface temperature corresponding to a temperature of a housing surface of the imaging apparatus and a second housing inside temperature corresponding to a temperature of a housing inside of the imaging apparatus,
wherein the calculation unit calculates as the time limit a predicted time until the housing surface temperature of the imaging apparatus reaches the first temperature,
wherein the control unit performs control to update and display the time limit based on the calculated predicted time and a lapse of time,
wherein the control unit performs control, in the recording state, to stop recording a moving image in response to a lapse of the time limit displayed by the display unit in the standby state, and
wherein the control unit performs control, in the recording state, to stop recording the moving image even if the time limit has not elapsed in a case where the housing inside temperature acquired by the acquisition unit reaches the second temperature.

19. A control method of an electronic device, the control method comprising:
acquiring a temperature of an imaging apparatus;
calculating a time limit for limiting a recording time of recording of a moving image based on the acquired temperature; and
performing control, in a standby state where a moving image is not recorded in a moving image recording mode, to update the time limit based on the calculated time limit and an elapsed time without using the temperature of the imaging apparatus when the time limit is updated and to display the updated time limit on a display unit; wherein, in the standby state, the control unit performs control to compare the time limit calculated by the calculation unit and a recordable time calculated based on a remaining capacity of a recording medium for recording a moving image, to display the recordable time in a case where the recordable time is shorter, and to display the updated time limit in a case where the calculated time limit is shorter.

20. A non-transitory computer-readable storage medium storing a program that causes a computer to execute a control method for controlling of an electronic device, the control method comprising:
acquiring a temperature of an imaging apparatus;
calculating a time limit for limiting a recording time of recording of a moving image based on the acquired temperature; and
performing control, in a standby state where a moving image is not recorded in a moving image recording mode, to update the time limit based on the calculated time limit and an elapsed time without using the temperature of the imaging apparatus when the time limit is updated and to display the updated time limit on a display unit; wherein, in the standby state, the control unit performs control to compare the time limit calculated by the calculation unit and a recordable time calculated based on a remaining capacity of a recording medium for recording a moving image, to display the recordable time in a case where the recordable time is shorter, and to display the updated time limit in a case where the calculated time limit is shorter.

* * * * *